(12) United States Patent
Xu

(10) Patent No.: US 12,521,667 B2
(45) Date of Patent: Jan. 13, 2026

(54) GAS TURBINE ENGINE WITH ENTRAINED PARTICLE AGGLOMERATORS AND METHOD

(71) Applicant: RTX Corporation, Farmington, CT (US)

(72) Inventor: JinQuan Xu, East Greenwich, RI (US)

(73) Assignee: RTX CORPORATION, Farmington, CT (US)

( * ) Notice: Subject to any disclaimer, the term of this patent is extended or adjusted under 35 U.S.C. 154(b) by 288 days.

(21) Appl. No.: 18/376,675

(22) Filed: Oct. 4, 2023

(65) Prior Publication Data
US 2025/0116226 A1 Apr. 10, 2025

(51) Int. Cl.
*B01D 51/08* (2006.01)
*B01D 49/00* (2006.01)
*F02C 7/052* (2006.01)

(52) U.S. Cl.
CPC .......... *B01D 51/08* (2013.01); *B01D 49/006* (2013.01); *F02C 7/052* (2013.01); *F05D 2260/607* (2013.01); *F23R 2900/00004* (2013.01)

(58) Field of Classification Search
CPC ....... F02C 7/05–055; B64D 2033/0246; F05D 2260/607; F23R 2900/00004; B03C 3/0175; B01D 49/006; B01D 2259/816; B01D 51/02–08; B01D 45/16; F01D 25/32

See application file for complete search history.

(56) References Cited

U.S. PATENT DOCUMENTS

| | | | |
|---|---|---|---|
| 5,197,399 A | 3/1993 | Mansour | |
| 5,758,486 A | 6/1998 | Fetescu | |
| 6,308,511 B1 | 10/2001 | Beeck | |
| 6,749,666 B2 * | 6/2004 | Meegan, Jr. | B01D 51/08 55/318 |
| 8,603,207 B2 | 12/2013 | Zhang | |
| 9,546,603 B2 * | 1/2017 | Meier | F02C 7/30 |
| 9,631,554 B2 * | 4/2017 | Howe | B03C 3/12 |
| 10,227,925 B2 * | 3/2019 | Snyder | F02C 7/05 |
| 10,563,579 B2 * | 2/2020 | Duge | B03C 3/0175 |
| 11,261,788 B2 * | 3/2022 | Koka | B01D 51/02 |
| 2018/0003110 A1 | 1/2018 | Bart | |
| 2019/0191252 A1 | 6/2019 | Lipkens | |

OTHER PUBLICATIONS

EP Search Report for EP Patent Application No. 24204834.6 dated Jan. 22, 2025.

* cited by examiner

Primary Examiner — Stephanie Sebasco Cheng
(74) Attorney, Agent, or Firm — Getz Balich LLC

(57) ABSTRACT

A turbine engine having an axial centerline is provided that includes a compressor section, a combustor section, an outer casing, an inner diffuser case, a turbine section, a particle separator, and a particle agglomerator. The outer casing is disposed radially outside of and spaced apart from an annular combustor. A diffuser outer diameter (OD) flow path is disposed radially between the outer casing and the outer combustor wall. The inner diffuser case is disposed radially inside of and spaced apart from the annular combustor. A diffuser inner diameter (ID) flow path is disposed radially between the inner combustor wall and the inner diffuser case. The particle agglomerator is configured to produce acoustic signals that causes agglomeration of particles entrained in an air flow within the turbine engine.

18 Claims, 9 Drawing Sheets

GAS TURBINE ENGINE WITH ENTRAINED PARTICLE AGGLOMERATORS AND METHOD

BACKGROUND OF THE INVENTION

1. Technical Field

The present disclosure relates to gas turbine engines in general and to gas turbine engine including entrained particle separation device in particular.

2. Background Information

Debris entrained in air that is ingested into the core of a turbine engine negatively impacts the durability of engine components such as combustors and turbines because the debris can clog cooling passages and build up on impingement surfaces, thereby reducing the efficiency of heat conduction. Air contamination primarily occurs at takeoff and landing due to the higher concentration of dirt particles near the ground. Once the dirt reaches the hottest part of the engine, in the combustor and HPT, it tends to be a very small particle size because it has passed through the compressor. What is needed is an improved system for removing entrained articles from air passing within a turbine engine.

SUMMARY

According to an aspect of the present disclosure, a turbine engine having an axial centerline is provided that includes a compressor section, a combustor section, an outer casing, an inner diffuser case, a turbine section, a particle separator, and a particle agglomerator. The outer casing is disposed radially outside of and spaced apart from an annular combustor. A diffuser outer diameter (OD) flow path is disposed radially between the outer casing and the outer combustor wall. The inner diffuser case is disposed radially inside of and spaced apart from the annular combustor. A diffuser inner diameter (ID) flow path is disposed radially between the inner combustor wall and the inner diffuser case. The particle agglomerator is configured to produce acoustic signals that causes agglomeration of particles entrained in an air flow within the turbine engine.

In any of the aspects or embodiments described above and herein, the particle agglomerator may be disposed to act on the air flow upstream of the particle separator within the turbine engine.

In any of the aspects or embodiments described above and herein, the particle agglomerator may include a first particle agglomerator disposed in the diffuser OD flow path, and a second particle agglomerator disposed in the diffuser ID flow path.

In any of the aspects or embodiments described above and herein, the particle agglomerator may include a plurality of first particle agglomerators disposed in the diffuser OD flow path, and a plurality of second particle agglomerators disposed in the diffuser ID flow path.

In any of the aspects or embodiments described above and herein, the plurality of first particle agglomerators may be axially spaced apart from one another within the diffuser OD flow path, and the plurality of second said particle agglomerators may be axially spaced apart from one another within the diffuser ID flow path.

In any of the aspects or embodiments described above and herein, the particle agglomerator may include a first particle agglomerator and a second particle agglomerator, and the first particle agglomerator may be configured to produce first acoustic signals and the second particle agglomerator may be configured to produce second acoustic signals, and the first acoustic signals are different than the second acoustic signals.

In any of the aspects or embodiments described above and herein, the particle separator may be disposed in the diffuser OD flow path or the diffuser ID flow path.

In any of the aspects or embodiments described above and herein, the particle agglomerator may be controllable between an on mode wherein the particle agglomerator produces acoustic signals, and an off mode wherein the particle agglomerator does not produce acoustic signals.

In any of the aspects or embodiments described above and herein, the particle agglomerator may be controllable to produce acoustic signals at a first frequency and to produce acoustic signals at a second frequency, the second frequency different than the first frequency.

In any of the aspects or embodiments described above and herein, the turbine engine may include a fluid injector configured to inject fluid into the air flow.

According to an aspect of the present disclosure, a method of removing particles entrained within an air flow passing through a turbine engine is provided. The turbine engine includes a combustor section having an annular combustor, a diffuser outer diameter (OD) flow path, and a diffuser inner diameter (ID) flow path. The method includes: using a particle agglomerator to subject particles entrained within an air flow passing through a turbine engine to acoustic signals, the acoustics signal configured to cause at least some of the entrained particles to agglomerate with one another; and using at least one particle separator to remove the agglomerated particles.

In any of the aspects or embodiments described above and herein, wherein the method may include the step of controlling the particle agglomerator to be in an on mode during aircraft takeoff and during aircraft landing, and controlling the particle agglomerator to be in an off mode during aircraft cruise.

In any of the aspects or embodiments described above and herein, the method may include the step of injecting a fluid into the air flow upstream of the at least one particle agglomerator.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
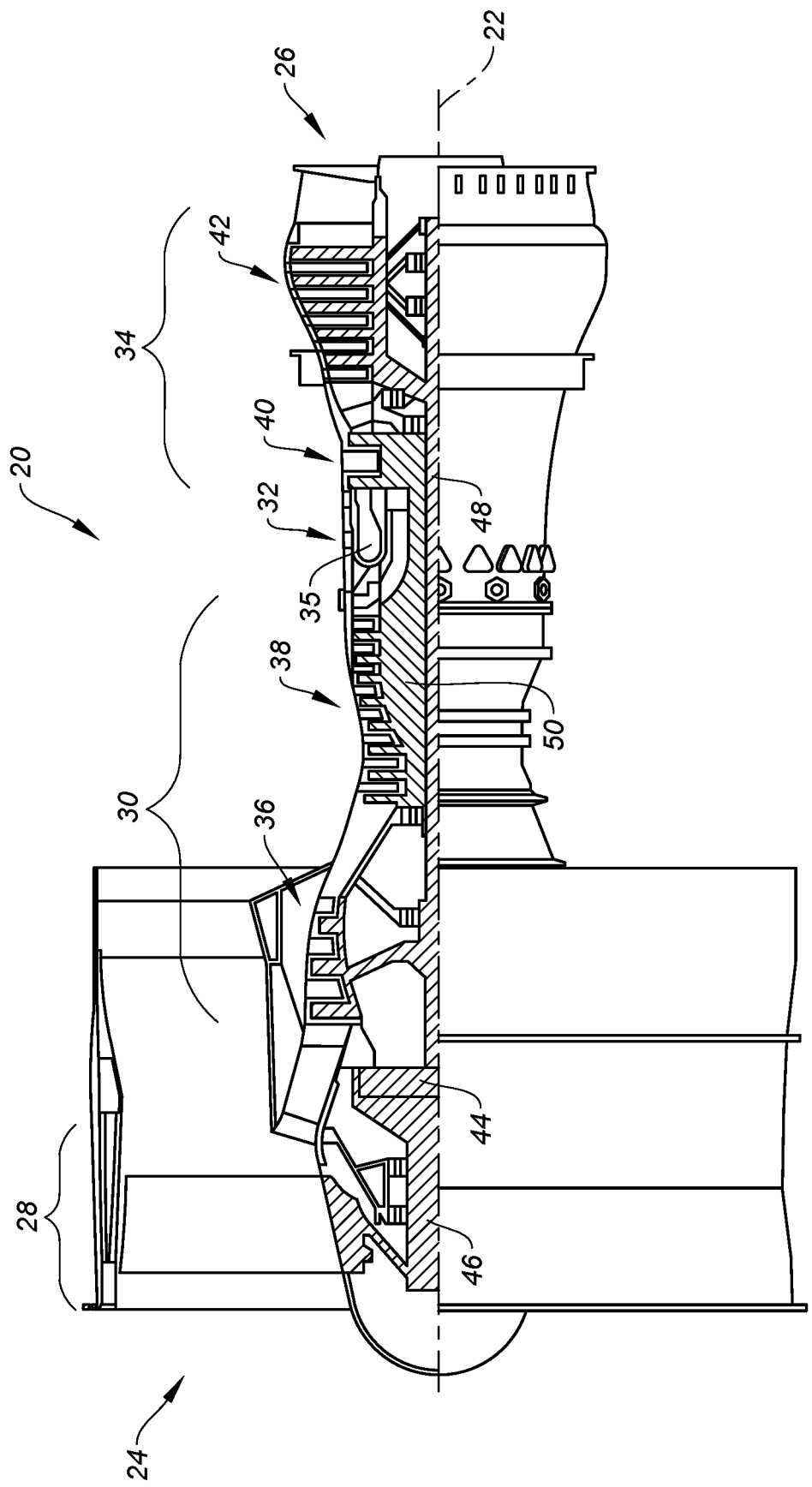
FIG. 1 is a diagrammatic sectional view of a gas turbine engine.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes a combustor 35. The compressor section 30 includes a low pressure compressor (LPC) 36 and a high pressure compressor (HPC) 38. The turbine section 34 includes a high pressure turbine (HPT) 40 and a low pressure turbine (LPT) 42. The engine sections are arranged sequentially along the centerline 22. The fan section 28 is connected to a geared architecture 44, for example, through a fan shaft 46. The geared architecture 44 and the LPC 36 are connected to and driven by the LPT 42 through a low speed shaft 48. The HPC 38 is connected to and driven by the HPT 40 through a high speed shaft 50. The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a convention axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration.

Figure 2:
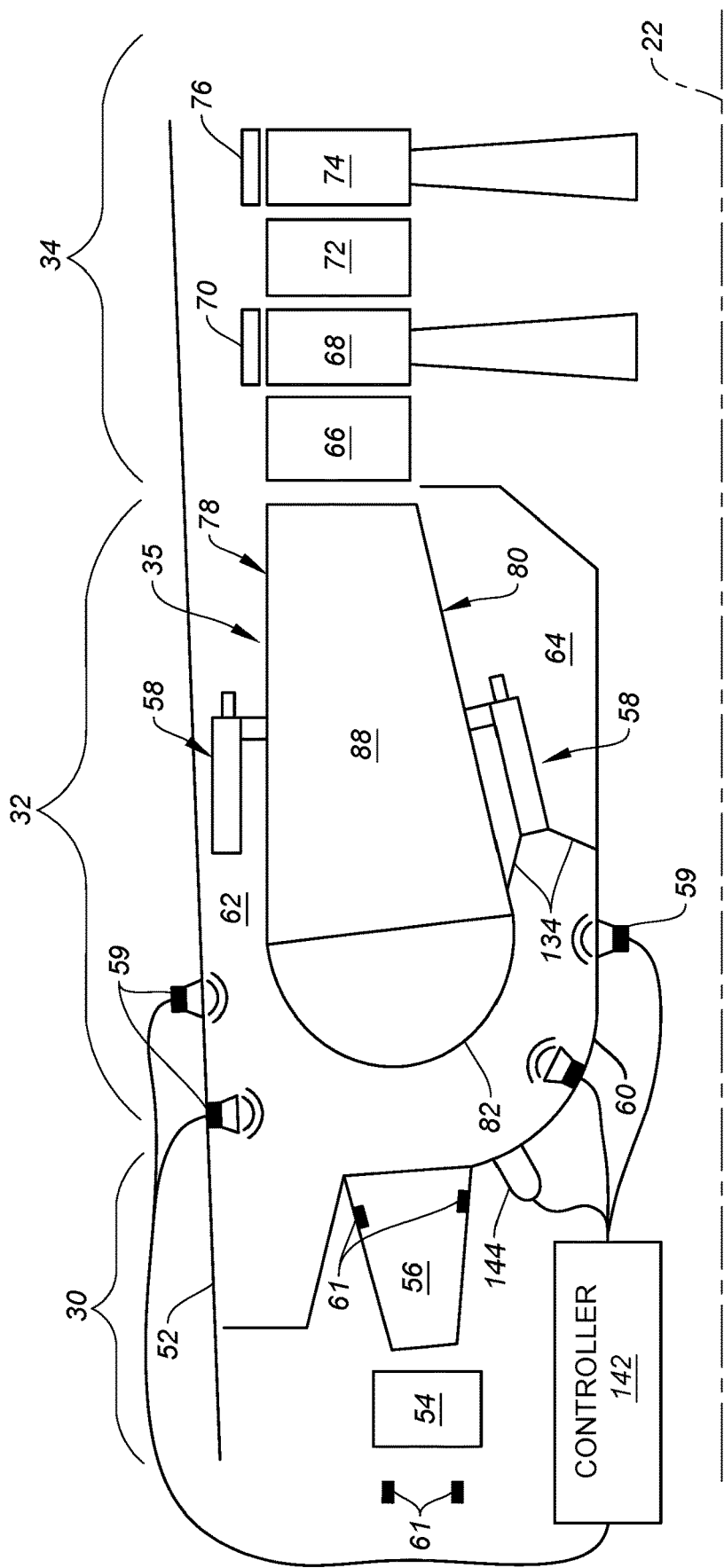
FIG. 2 is a diagrammatic partial view of a gas turbine engine embodiment.

FIG. 2 is a diagrammatic partial view of a gas turbine engine embodiment according to aspects of the present disclosure. The engine shown in FIG. 2 includes a compressor section 30, a combustor section 32, and a portion of a HPT 40. An outer casing 52 is disposed radially outside of the compressor section 30, the combustor section 32 and the turbine section 34. The compressor section 30 includes a compressor stator vane stage 54 and a compressor discharge 56. The combustor section 32 includes a combustor 35, at least one particle separator 58, and an inner diffuser case 60. A diffuser outer diameter (OD) flow path 62 is disposed radially between the combustor 35 and the outer casing 52. A diffuser inner diameter (ID) flow path 64 is disposed radially between the combustor 35 and the inner diffuser case 60. The embodiment shown diagrammatically in FIG. 2 illustrates particle separators 58 disposed within the diffuser OD flow path 62 and the diffuser ID flow path 64. The present disclosure does not require particle separators 58 disposed in both the diffuser OD flow path 62 and the diffuser ID flow path 64. In some embodiments deflection panels 134 may be disposed relative to a particle separator 58 to direct diffuser airflow into the particle separator 58. The embodiment shown diagrammatically in FIG. 2 also illustrates particle agglomerators 59 disposed upstream of the particle separators 58. In the embodiment shown in FIG. 2, the particle agglomerators 59 are disposed within the diffuser OD flow path 62 and the diffuser ID flow path 64 upstream of the particle separators 58. Disposing the particle agglomerators 59 within the diffuser OD flow path 62 and the diffuser ID flow path 64 upstream of the particle separators 58 is beneficial (as will be described herein) but is not required-one or more particle agglomerators 59 may be disposed elsewhere in the engine to permit agglomeration of particles upstream of the particle separators 58. The present disclosure also does not require particle agglomerators 59 disposed in both the diffuser OD flow path 62 and the diffuser ID flow path 64. The turbine section 34 includes a first HPT stator vane stage 66, a first HPT rotor stage 68, a first HPT rotor stage blade outer air seal (BOAS) 70, a second HPT stator vane stage 72, a second HPT rotor stage 74, and a second HPT rotor stage BOAS 76.

Figure 3:
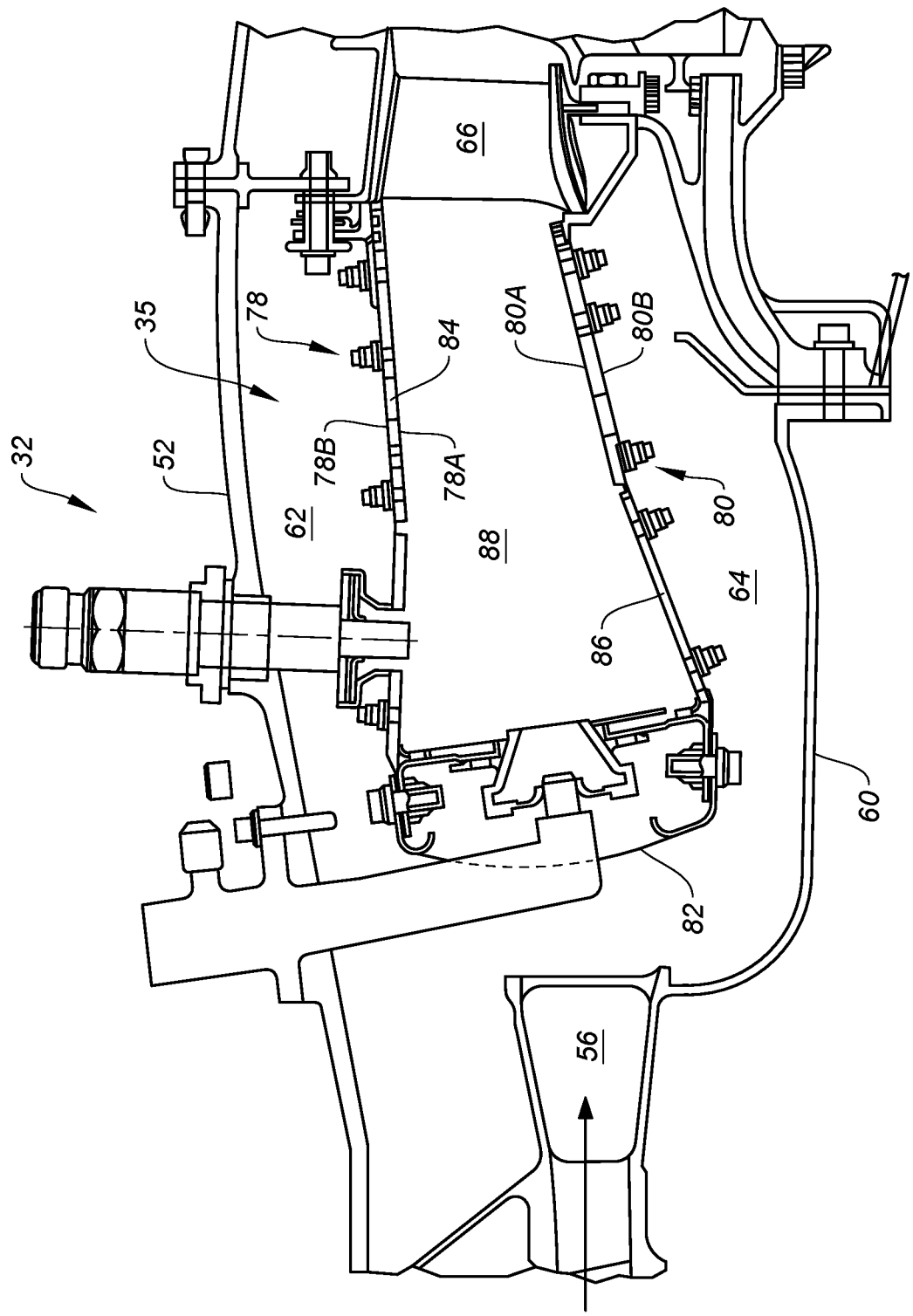
FIG. 3 is a diagrammatic sectioned partial view of a gas turbine engine embodiment.

FIG. 3 diagrammatically illustrates a non-limiting example of a combustor 35 having an outer combustor wall assembly 78, an inner combustor wall assembly 80, and a bulkhead assembly 82. The outer combustor wall assembly 78 includes an outer support shell 78A that supports liner panels 78B mounted thereto. The liner panels 78B mounted on the outer support shell 78A form a cavity 84 therebetween. In similar fashion, the inner combustor wall assembly 80 includes an inner support shell 80A that supports liner panels 80B mounted thereto. The liner panels 80B mounted on the inner support shell 80A form a cavity 86 therebetween. The outer combustor wall assembly 78 and the inner combustor wall assembly 80 are spaced apart from one another to define an annular combustion chamber 88 therebetween, with the liner panels forming a portion of the interior boundary of the combustion chamber 88. The bulkhead assembly 82 includes fuel nozzles circumferentially distributed around the annular combustor 35. The bulkhead assembly 82 may be attached to the inner and outer combustor wall assemblies 78, 80.

Figure 4:
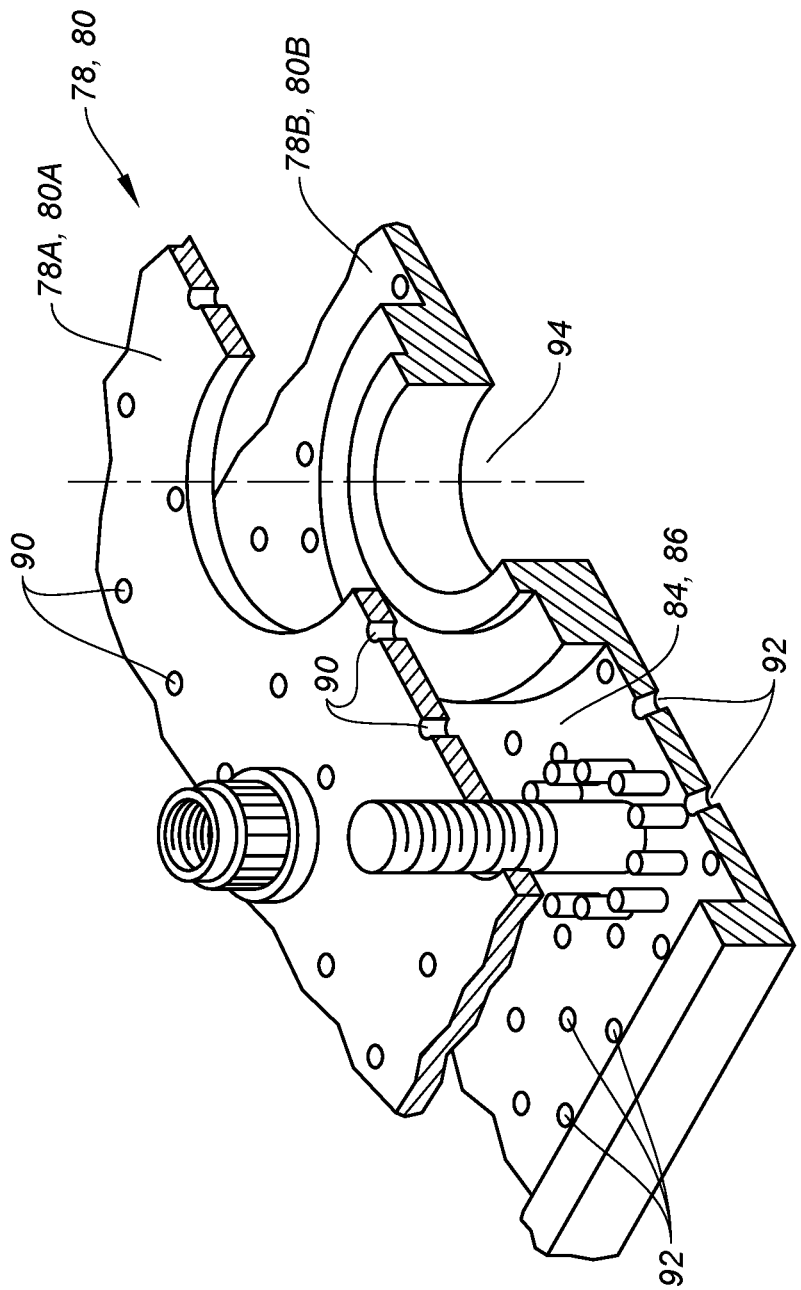
FIG. 4 is a diagrammatic sectioned partial view of a combustor wall assembly.

FIG. 4 diagrammatically illustrates a partial view of a generic support shell 78A, 80A, liner panel 78B, 80B, and a cavity 84, 86 disposed therebetween. The support shell 78A, 80A and liner panel 78B, 80B are representative of an outer or inner combustor wall assembly 78, 80. As can be seen in FIG. 4, the support shell 78A, 80A includes a plurality of apertures 90 configured to allow cooling air therethrough, and the liner panel 78B, 80B includes a plurality of apertures 92 configured to allow cooling air therethrough. As can also be seen in FIG. 4, the combustor wall assembly 78, 80 may include a plurality of dilution apertures 94 that provide an air passage through the combustor wall assembly 78, 80 to permit air to enter the combustion chamber 88 the opposite side of the combustor wall assembly 78, 80 (e.g., from the diffuser OD path or the diffuser ID path as will be detailed herein). The dilution apertures 94 typically have a diameter substantially larger than the cooling hole apertures 90, 92 disposed within the support shell or liner panel. A combustor 35 may include some dilution apertures 94 of a first diameter and other dilution apertures 94 of a second diameter different from the first diameter. The combustor 35 shown in FIG. 3 and the generic combustor wall assembly 78, 80 shown in FIG. 4 are examples used to illustrate the present disclosure and the present disclosure is not limited thereto.

As stated above, debris (e.g., particles) entrained in air that is ingested into the core of a turbine engine 20 may negatively impact the durability of components within the combustor section 32 and the turbine section 34 because the debris can clog cooling passages and build upon impingement surfaces, thereby reducing the efficiency of heat conduction. Entrained particles that reach the hot sections of the turbine engine 20 tend to have a very small particle sizes because they have passed through the compressor section 30.

Figure 5:
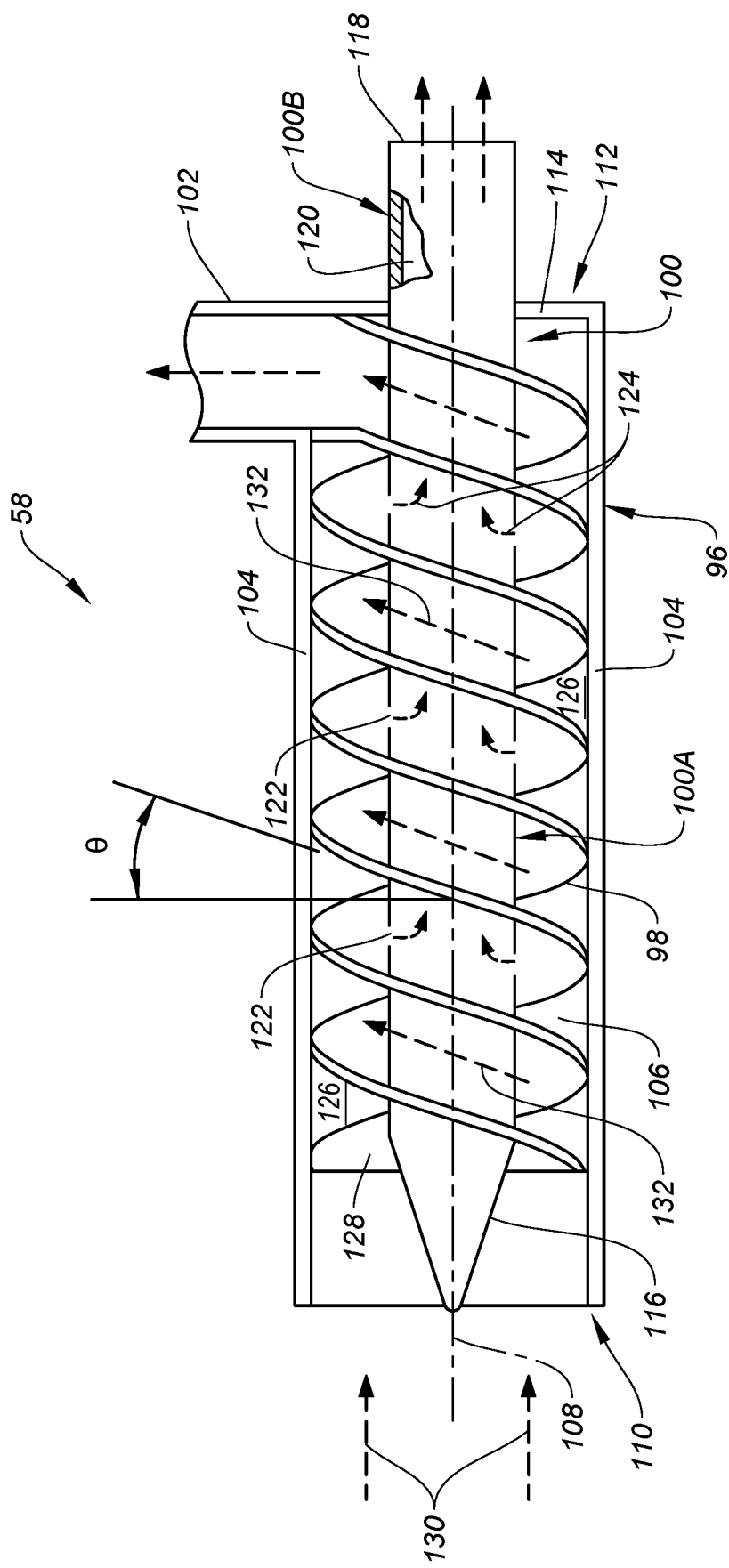
FIG. 5 is a diagrammatic sectioned view of a present disclosure particle separator embodiment.

The present disclosure utilizes particle separators 58 disposed within the diffuser ID flow path 64 and/or the diffuser OD flow path 62 to separate debris from the air ingested into the core of the turbine engine 20. In some embodiments, a present disclosure particle separator 58 may be configured to centrifugally separate particles entrained within the air entering the combustor section 32. An example of such a particle separator 58 is shown in FIG. 5 and includes a housing 96, a helical member 98, a cavity member 100, and an aft exhaust passage 102. The housing 96 is defined by an exterior wall 104 that encloses an interior cavity 106. The housing 96 extends along a central axis 108 between a forward end 110 and an aft end 112. In the example shown in FIG. 5, the housing 96 has a cylindrical configuration but the present disclosure is not limited thereto; e.g., the housing 96 may have a tapered configuration wherein the cross-sectional area at the forward end 110 is greater than the cross-sectional area at the aft end 112. The forward end 110 of the housing 96 is open (forming a forward end inlet) and the aft end 112 of the housing 96 may be closed by an aft wall 114. The aft exhaust passage 102 extends laterally outward from the housing 96 adjacent the aft end 112 of the housing 96, and it provides a first airflow exit from the particle separator 58. In the example shown diagrammatically in FIG. 5, the aft exhaust passage 102 is shown extending in a direction that is substantially perpendicular to the central axis 108 of the housing 96. The present disclosure is not limited to this aft exhaust passage 102 orientation; e.g., the aft exhaust passage 102 may extend out at an angle that coincides with the helical passage angle ("θ") as detailed herein. In some embodiments, a distal end of the aft exhaust passage 102 may be configured to engage with an aperture within the outer or inner combustor wall assembly 78, 80; e.g., configured to engage with a dilution aperture 94. In some embodiments, an aft exhaust passage 102 may be configured such that the aft exhaust passage 102 is not directly engaged with an aperture (e.g., a dilution aperture 94) within the outer or inner combustor wall assembly 78, 80 but rather is disposed to direct airflow into the aforesaid aperture. In this manner, the inner or outer combustor wall assembly 78, 80 and the aft exhaust passage 102 are able to accommodate relative movement (e.g., vibration, differential thermal growth, and the like) therebetween more readily.

The cavity member 100 extends along the central axis 108 between a forward end 116 and an aft end 118. The forward end 116 of the cavity member 100 may expand in diameter forward to aft (e.g., a tapered configuration as shown, or an arcuate configuration such as parti-spherical, parti-ellipsoidal, or the like) but is not limited to any particular configuration. The cavity member 100 is hollow (e.g., having an interior region 120) and the aft end 118 is open (forming a second airflow exit from the particle separator 58). The cavity member 100 is configured (e.g., via perforations 122 or the like) to receive airflow (shown as arrows 124) passing through the helical passage 126 as will be detailed herein. The cavity member 100 shown in FIG. 5 extends beyond the aft end 112 of the housing 96; e.g., a first portion 100A of the cavity member 100 is disposed within the interior cavity 106 of the housing 96 and a second portion 100B of the cavity member 100 is disposed outside of the housing 96. The present disclosure does not require a second portion 100B that extends outside the housing 96. The helical member 98 is disposed within the interior cavity 106 of the housing 96, disposed between the exterior wall 104 of the housing 96 and the cavity member 100. The helical member 98 defines a helical passage 126 within the interior cavity 106 of the housing 96 that begins at an open end 128 adjacent the forward end 110 of the housing 96 and terminates at the aft exhaust passage 102. In FIG. 5, the open end 128 of the helical passage 126 is disposed slightly aft of the forward end 116 of the cavity member 100. In those embodiments wherein the forward end 116 of the cavity member 100 has a diameter increasing configuration (e.g., tapered, spherical, ellipsoidal, or the like), the forward end 116 of the cavity member 100 facilitates airflow entry into the helical passage 126. The helical member 98 may be sealed with the exterior wall 104 of the housing 96 and the cavity member 100 to ensure all airflow (shown as arrows 130) entering the helical passage 126 either travels throughout the helical passage 126 (shown as arrows 132) and exits the aft exhaust passage 102 or exits into the cavity member 100. The particle separator 58 embodiment shown in FIG. 5 includes approximately eight helical turns, each disposed at an angle theta ("θ"). The present disclosure particle separator 58 is not limited to any particular number of turns, or any particular helical turn angle.

Particles entrained in air very often possess a static charge (positive or negative charge). The aforesaid static charge may result from contact between the particles and other objects; e.g., other particles and/or surfaces. The compressing work performed on the air by the compressor section 30 upstream of the combustor section 32 may increase the probability of entrained particles possessing a static charge. The compressing work may also decrease the percentage of particles having a relatively larger diameter and increase the percentage of particles having a relatively smaller diameter. In some embodiments, the particle separator 58 may be configured such that a portion of the particle separator 58 possesses an electrostatic charge continuously or intermittently. The present disclosure is not limited to any particular means for producing an electrostatic charge on a portion of the particle separator 58. The electrostatically charged portion of the particle separator 58 may facilitate particle separation by attracting the particles in a predetermined direction thereby increasing the concentration of particles within a first portion of the airflow traveling within the separator and decreasing the concentration of particles within a second portion of the airflow traveling within the separator. For example, an embodiment of the present disclosure particle separator 58 may be configured such that the housing exterior wall 104 possesses an electrostatic charge (e.g., a positive electrical charge) that is opposite the static charge (e.g., a negative electrical charge) possessed by entrained particles. The potential difference between the aforesaid charges motivates the particles toward the housing exterior wall 104. The particle separator 58 housing is a non-limiting example of a portion of the separator 58 that may possess an electrostatic charge. The present disclosure is not limited to any particular mechanism for producing the electrostatic charge; e.g., an energy source that provides an electrical bias, or an electromagnetic field source, or the like.

Figure 6:
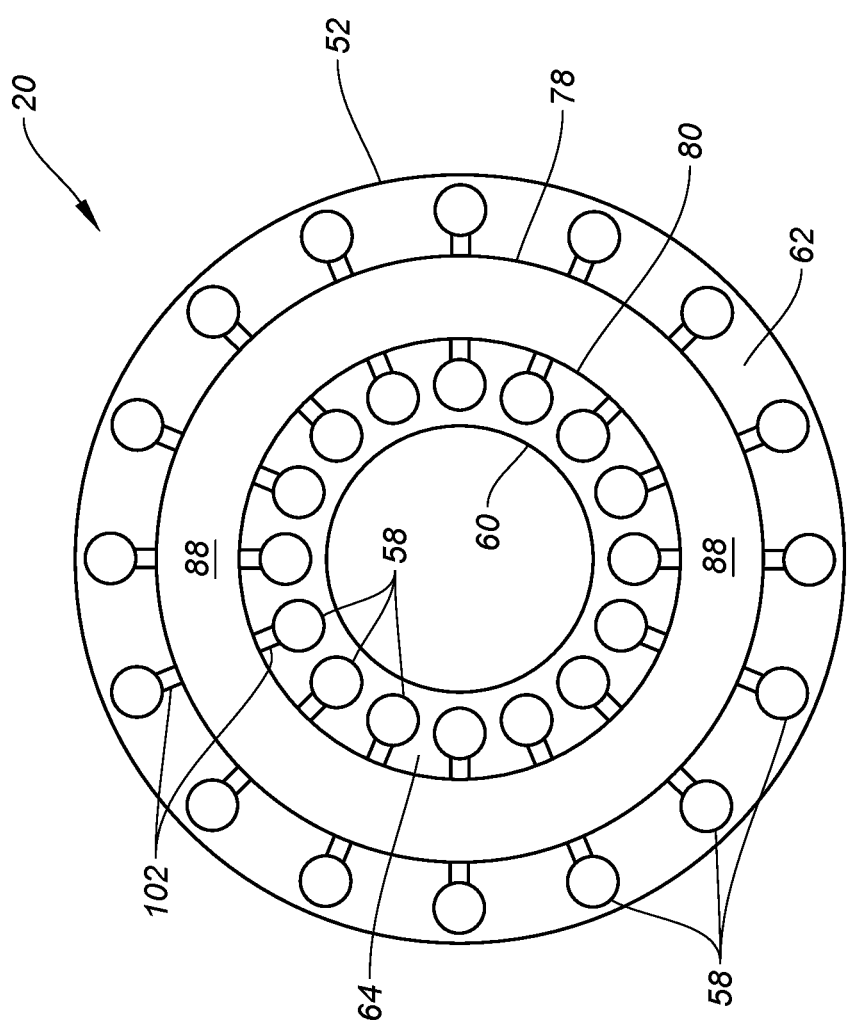
FIG. 6 is a diagrammatic partial view of a gas turbine engine embodiment.

FIG. 6 diagrammatically illustrates a view directed along the axial centerline 22 of the turbine engine (see FIG. 1), diagrammatically illustrating the annular relationship of the outer casing 52, the diffuser OD flow path 62, the combustor 35, the diffuser ID flow path 64, and the inner diffuser case 60. FIG. 6 illustrates a plurality of particle separators 58 disposed within the diffuser OD and ID flow paths 62, 64, circumferentially spaced apart from one another in the respective flow path 62, 64. FIG. 6 illustrates the particle separators 58 in the diffuser OD and ID flow paths 62, 64 uniformly spaced apart from one another around the circumference. The present disclosure is not limited to having uniform circumferential particle separator 58 spacing in either the diffuser OD flow path 62 or the diffuser ID flow path 64. For example, if in a given application the concentration of entrained particles is greater in a first circumferential region than in a second circumferential region, the separator circumferential positioning may be adjusted to deploy particle separators 58 closer to one another in the first region than in the second region. The present disclosure is not limited to disposing any particular number of particle separators 58 in either the diffuser OD flow path 62 or the diffuser ID flow path 64. In some applications, particle separators 58 may be disposed in only the diffuser OD flow path 62 or the diffuser ID flow path 64. FIG. 6 illustrates an embodiment wherein the same number of particle separators 58 are disposed in the diffuser OD flow path 62 and in the diffuser ID flow path 64. The present disclosure is not limited to this embodiment; e.g., in some embodiments the number of particle separators 58 disposed in the diffuser OD flow path 62 may be different than the number of particle separators 58 disposed in the diffuser ID flow path 64. In the diagrammatic representation shown in FIG. 6, the respective separator aft exhaust passages 102 are shown engaged with the outer or inner combustor wall assembly 78, 80. As stated above, the present disclosure is not limited thereto and the respective aft exhaust passages 102 alternatively may not be directly engaged with the outer or inner combustor wall assembly 78, 80. In some embodiments, some of the aft exhaust passages 102 may be directly engaged with the outer or inner combustor wall assembly 78, 80, and others may not be directly engaged with the outer or inner combustor wall assembly 78, 80.

Figure 7:
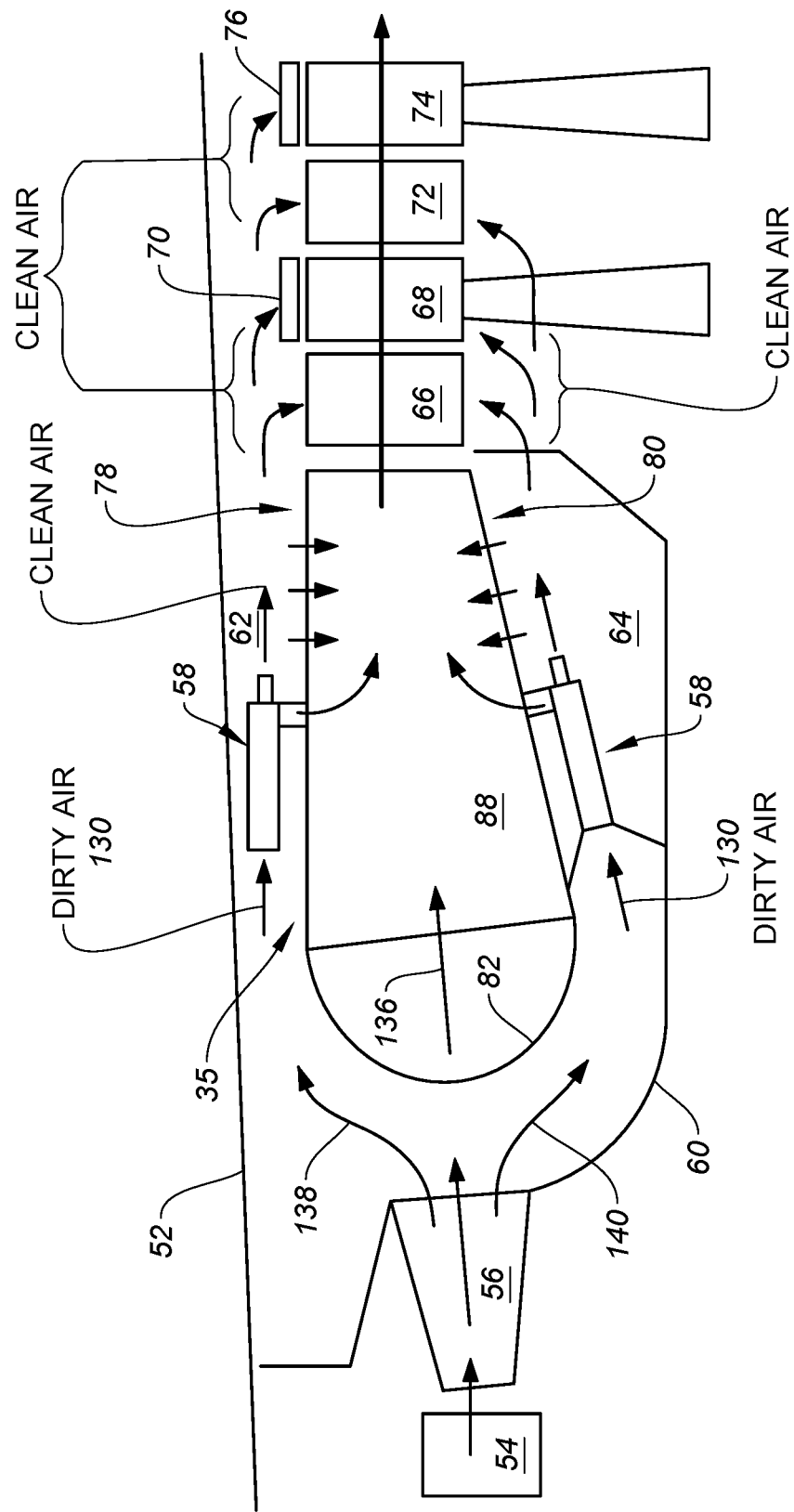
FIG. 7 is a is a diagrammatic partial view of a gas turbine engine embodiment.
Figure 8:
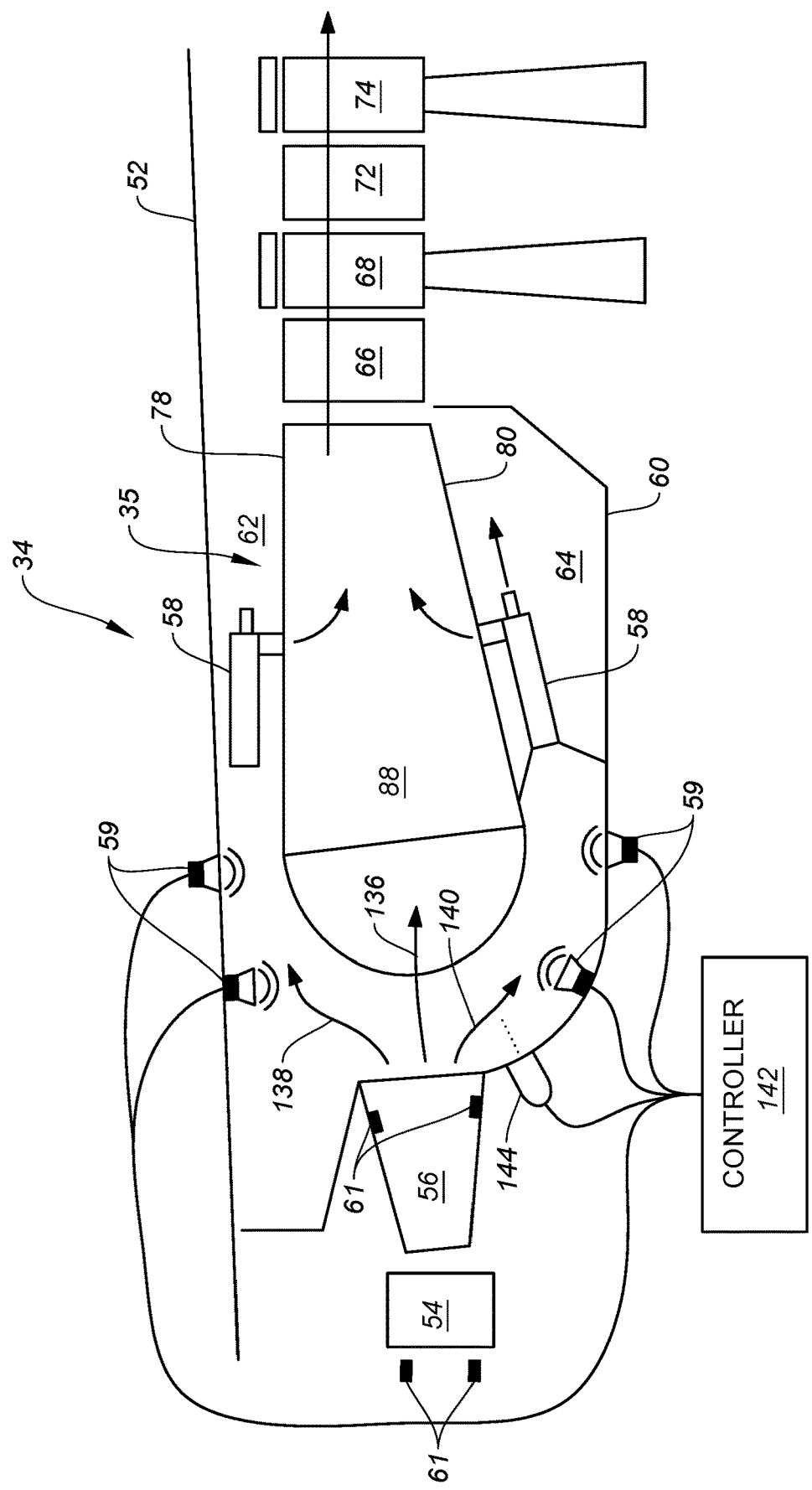
FIG. 8 is a diagrammatic sectioned view of a present disclosure particle separator embodiment.
Figure 9:
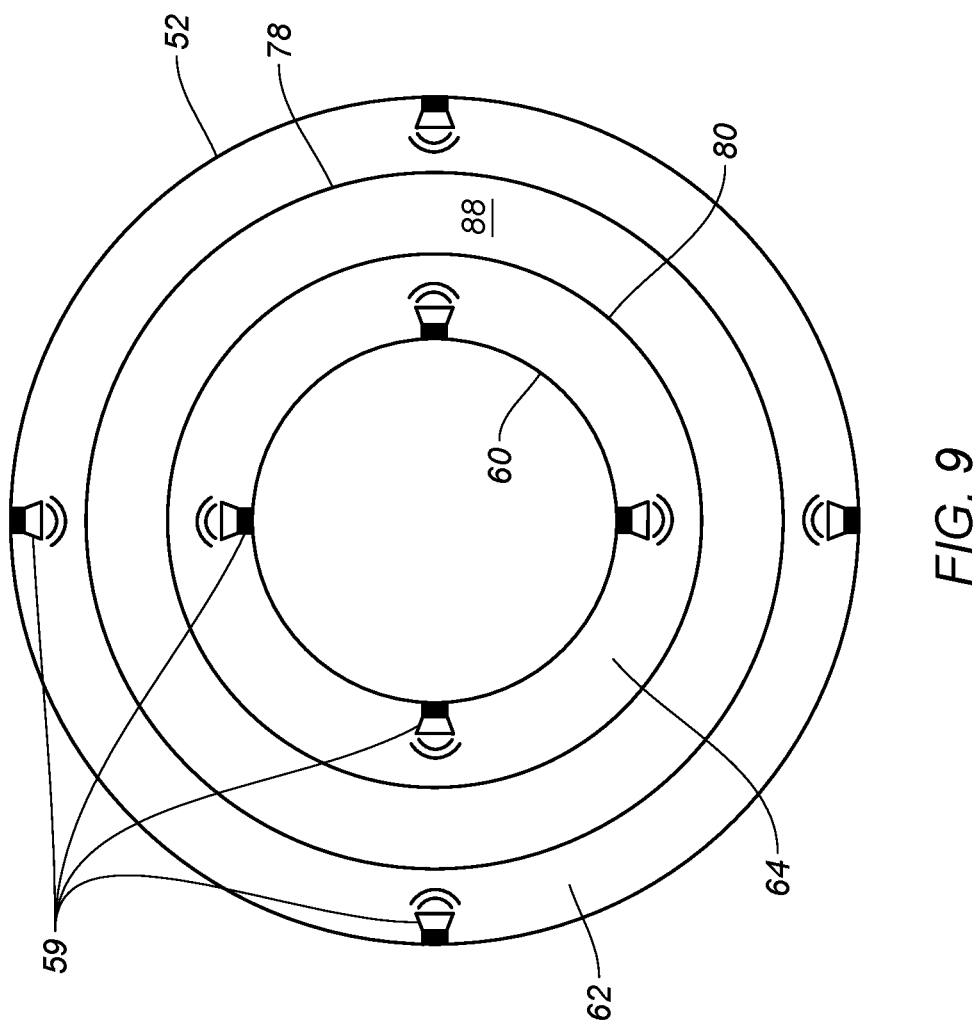
FIG. 9 is a diagrammatic partial view of a gas turbine engine embodiment.

As stated above, embodiments of the present disclosure may utilize one or more particle agglomerators 59 disposed upstream of the particle separators 58. A present disclosure particle agglomerator 59 may be configured to use acoustic signals to cause particles entrained within the air flow upstream of the particle separators 58 to agglomerate. Entrained particles that combine with one another (i.e., "agglomerate") may increase in mass and/or in size. Agglomerated entrained particles are understood to facilitate particle separation within an air flow; e.g., agglomerated particles are more susceptible to centrifugal separation due to their increased mass and/or size. A present disclosure particle agglomerator 59 may be configured to produce acoustic signals that are not present within the air flow path environment (e.g., at a frequency not normally present during operation of the engine at the time of agglomeration), or a present disclosure particle agglomerator 59 may be configured to modify (e.g., amplify, filter, separate, and the like) acoustic signals that are normally present within the air flow path environment during operation into a form that acoustically produces particle agglomeration, or some combination thereof. Present disclosure particle agglomerators 59 may be configured to utilize various mechanisms to produce particle interactions (e.g., orthokinetic interactions, hydrodynamic interactions, and the like) that produce the desired particle agglomerations. The characteristics of the acoustic signals that cause particle agglomeration may be selected based on the characteristics (e.g., mass, size, and the like) of particles to be agglomerated. For example, the frequency and intensity of the acoustic signals may be selected based on the propensity of those acoustic signals to cause agglomeration of target entrained particles; e.g., particular size particles, and the like. In general, lower frequencies in the human audible range (i.e., about 20 Hz to 20,000 Hz) are understood to be effective for the agglomeration of particles in the micron and sub-micron ranges. The present disclosure is not, however, limited to using acoustic signals in the frequency range of 20-20,000 Hz. It is currently understood that acoustic signals above 20,000 Hz (e.g., up to 40,000 Hz) may be effective to cause agglomeration of particles entrained within a turbine engine gas path. Hence, the present disclosure contemplates that acoustic signals at any frequency that is useful to cause particle agglomeration of particles entrained within a gas path of a turbine engine 20 may be used. The rate at which particle agglomerations may occur may also be a function of the intensity of the acoustic signals. In some applications, agglomeration may benefit from using higher intensity (e.g., higher decibels or "dBs") acoustic signals. The residence time (i.e., the amount of time the particles are exposed to the acoustic field) may be selected as appropriate for the particles to be agglomerated. The acoustic signals utilized by the present disclosure particle agglomerators 59 are preferably benign to the operation of the turbine engine 20. In some embodiments, a present disclosure embodiment that utilizes a particle agglomerator 59 may also include mechanisms for mitigating undesirable effects that may be produced by the aforesaid acoustic signals. For example, the present disclosure may include structure and/or controls configured to actively (e.g., noise cancellation) or passively (e.g., acoustic insulation) mitigate acoustic signal propagation outside of the zone in which particle agglomeration is desired.

As described herein, present disclosure particle agglomerators 59 are disposed upstream of the particle separators 58. It is understood that disposing particle agglomerators 59 within the diffuser OD flow path 62 and the diffuser ID flow path 64 upstream of the particle separators 58 (e.g., as shown diagrammatically in FIG. 8) is particularly useful. In these positions, the particle agglomerators 59 are downstream of the compressor section 30 where entrained particles may in general decrease in size (thereby making agglomeration more impactful) and upstream of the particle separators 58 where particle separation may occur to protect downstream combustor 35 and/or turbine section 34 engine components. The present disclosure is not, however, limited to disposing a particle agglomerator 59 downstream of the compressor section 30; e.g., a particle agglomerator 59 may be disposed in communication with the compressor section 30 or upstream of the compressor section 30. More specifically, a particle agglomerator 59 may be disposed anywhere it can be controlled to produce acoustic signals that are useful to cause particle agglomeration of particles entrained within a gas path of a turbine engine 20. It is understood that particle agglomeration is particularly useful upstream of a particle separator 58, and in particular upstream of a particle separator 58 that utilizes centrifugal force to separate particles, but the present disclosure is not limited thereto and the present disclosure may be utilized in any application wherein particle agglomeration benefits removal of detrimental particle from air flow within the engine 20. FIGS. 2 and 8 diagrammatically show a plurality of particle agglomerators 59 deployed within the engine 20. The present disclosure is not limited to using any particular number of particle agglomerators 59; e.g., embodiments of the present disclosure may use one or more particle agglomerators 59. FIGS. 2 and 8 also diagrammatically show particle agglomerators 59 axially spaced apart from one another. Using acoustic signals at different positions may provide additional benefits; e.g., increasing the acoustic field residence time of a particle moving in a high velocity airflow. FIGS. 2 and 8 also diagrammatically show particle agglomerators 59 disposed within a flow path, and others in communication with (but not disposed within) a flow path. The present disclosure is not limited to locating particle agglomerators 59 in any particular location relative to a flow path.

In those embodiments that include more than one particle agglomerator 59, all of the agglomerators 59 may be identical (e.g., each producing the same acoustic signals (or modifying environmental signal in the same manner), or the plurality of particle agglomerators 59 may include differently configured particle agglomerators 59; e.g., one or more first particle agglomerators 59 having a first configuration (e.g., producing acoustic signals at a first frequency, or first intensity, or any combination thereof) and one or more second particle agglomerators 59 having a second configuration (e.g., producing acoustic signals at a second frequency, or second intensity, or any combination thereof), wherein the first acoustics signal are different from the second acoustic signals. Using different acoustic signal at different positions may provide several benefits; e.g., different frequencies for agglomerating different size entrained particles, and the like.

As diagrammatically shown in FIG. 9, the particle agglomerators 59 may be disposed at various different circumferential positions within the engine. FIG. 9 illustrates particle agglomerators 59 disposed in both the diffuser OD flow path 62 and the diffuser ID flow path 64 at a plurality of different circumferential positions. The present disclosure is not limited to any particular circumferential arrangement of particle agglomerators 59.

In some embodiments, a present disclosure particle agglomerator 59 may be configured in a fixed configuration that is not adjustable; e.g., a device that only produces acoustic signals having particular characteristics (e.g., frequency, intensity, and the like). In some embodiments, a present disclosure particle agglomerator 59 may be configured as a controllable device that can be controlled to produce selectively different acoustic signals; e.g., controllable to produce first acoustic signals at a first frequency, first intensity, and the like, and controllable to produce second acoustic signals at a second frequency, second intensity, and the like.

In those embodiments that include controllable particle agglomerators 59, the aforesaid agglomerators may be in communication with a controller 142. The controller 142 may be configured to control and/or receive signals therefrom to perform the functions described herein. The controller 142 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The controller 142 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. Communications between the controller 142 and other system components may be via a hardwire connection or via a wireless connection. In those embodiments that include controllable particle agglomerators 59, the present disclosure system may include sensors 61 (see FIGS. 2 and 8) configured to provide input that can be used in the control of the particle agglomerators 59; e.g., sensors configured to sense entrained particle size, density of particles within the air flow, and the like. FIGS. 2 and 8 diagrammatically show the sensors 61 disposed in the compressor discharge 56 as a non-limiting example. Sensors 61 may be placed anywhere appropriate to sense entrained particulates; e.g., FIGS. 2 and 8 diagrammatically illustrate sensors 61 disposed forward of the compressor stator vane stage 54 to illustrate that sensors may be located within the engine air flow inlet 24, or within the fan section 28, or within the compressor section 30, or anywhere else appropriate to sense entrained particulates.

In some embodiments, the present disclosure may be configured to introduce a fluid (either a liquid or a gas, or some combination thereof) into the air flow path upstream of the particle agglomerators 59; e.g., via one or more fluid injectors 144 (see FIGS. 2 and 8). A fluid disposed in an air flow with entrained particles that is subject to acoustic signals as described herein is understood to facilitate the acoustic agglomeration process. FIGS. 2 and 8 diagrammatically illustrate the injectors 144 disposed within the combustor section 32 as a non-limiting example. The fluid injectors 144 may be disposed anywhere they are beneficial to the acoustic agglomeration.

In the operation of a turbine engine 20 (e.g., see FIG. 1), air is drawn into the turbine engine 20 through an airflow inlet 24 and is typically directed through a fan section 28. The airflow exiting the fan section 28 enters the compressor section 30 where it is worked to a higher pressure and temperature. The compressed air exits the compressor section 30 and enters the combustor section 32. In many instances, the air that is worked within the compressor section 30 is unfiltered ambient air that contains entrained particles. Even if the air worked within the compressor section 30 has been filtered upstream, no filtration process (i.e., particle removement process) is perfect-some amount of particulate matter will remain entrained. As indicated above, it is understood that particles entrained within the air worked within the compressor section 30 tend to decrease in size. The decreased size particles are understood to have a greater propensity to adhere and build up on component surfaces. In some instances, built-up particulate matter upstream of the combustor 35 can release and once again become entrained particulate matter.

Entrained particulate matter can be particularly problematic in the combustor section 32 and the turbine section 34 where component cooling is required. In many applications, engine cooling schemes use relatively small diameter cooling apertures to produce impingement cooling and/or to establish cooling air boundary layer flow adjacent to a component surface, or the like. In these instances, the diameter of the cooling aperture may be directly related to the desired cooling effect. In some instances, the diameter of the cooling aperture is limited by the potential for particulate fouling; i.e., a minimum diameter of a cooling aperture is selected to avoid fouling and consequent cooling deficit.

The present disclosure provides a novel and unobvious system and method for removing entrained particles upstream of the engine components where particulate fouling is problematic; i.e., engine hot section components that utilize cooling air. FIG. 7 diagrammatically illustrates airflow into, within, and exiting the combustor section 32 into the turbine section 34. FIG. 7 diagrammatically illustrates present disclosure particle separators 58 disposed within both the diffuser OD flow path 62 and the diffuser ID flow path 64. As indicated above, the present disclosure does not require disclosure particle separators 58 disposed in both the diffuser OD flow path 62 and the diffuser ID flow path 64. The airflow exiting the compressor discharge 56 enters the combustor section 32 as combustor 35 primary flow 136, diffuser OD flow 138, and diffuser ID flow 140. The combustor primary flow 136 passes through the combustor bulkhead assembly 82 and is mixed with fuel and the mixture combusted. The air not utilized within combustion and the combustion products (collectively referred to hereinafter as "core gas flow") enters the turbine section 34 via the core gas flow path and provides motive force to drive the turbine section 34. The diffuser OD flow 138 enters the diffuser OD flow path 62 disposed radially outside of the combustor 35 and the diffuser ID flow 140 passes enters the diffuser ID flow radially inside of the combustor 35. The air entering the combustor 35, the diffuser OD flow path 62, and the diffuser ID flow path 64 very likely contains entrained particulate matter and is referred to hereinafter as "dirty air". Depending on the present disclosure configuration, all or a portion of the dirty air entering the diffuser OD flow path 62 will enter the particle separators 58 disposed within the diffuser OD flow path 62, and all or a portion of the dirty air entering the diffuser ID flow path 64 will enter the particle separators 58 disposed within the diffuser ID flow path 64.

Referring to FIG. 5, dirty air entering a particle separator 58 enters via the open forward end 110 of the particle separator 58 and is directed into the helical passage 126 disposed within the interior cavity 106 of the housing 96. As the dirty air passes through the helical passage 126, centrifugal forces act on any particles entrained within the dirty air. The greater mass particles are moved radially outward (i.e., toward the separator exterior wall 104) by the centrifugal forces as they pass through the helical passage 126. As a result, the concentration of particles within a portion of the air adjacent the exterior wall 104 will increase and the concentration of particles within a portion of the air adjacent the cavity member 100 will decrease. The portion of the air adjacent the cavity member 100 will enter the cavity member 100 (e.g., via perforations 122) and will travel axially therethrough until it exits the particle separator 58. The portion of the air adjacent the exterior wall 104 will continue to travel through the helical passage 126 until it reaches the aft exhaust passage 102.

In those embodiments of the present disclosure wherein a portion of the particle separator 58 is configured to possess an electrostatic charge, the particulate matter entrained within the dirty air enters the helical passage 126 disposed within the interior cavity 106 of the housing 96. As the dirty air passes through the helical passage 126, the electrostatically charged portion of the particle separator 58 (e.g., the housing exterior wall 104) attracts the oppositely charged entrained particles and provides a motive force that moves the entrained particles radially outward (i.e., toward the separator exterior wall 104). As a result, the concentration of particles within a portion of the air adjacent the exterior wall 104 will increase and the concentration of particles within a portion of the air adjacent the cavity member 100 will decrease. The portion of the air adjacent the cavity member 100 will enter the cavity member 100 and will travel axially therethrough until it exits the particle separator 58. The portion of the air adjacent the exterior wall 104 will continue to travel through the helical passage 126 until it reaches the aft exhaust passage 102. As stated herein, in some present disclosure embodiments the electrostatically charged portion of the particle separator 58 may be cycled between an "on mode" wherein the portion is electrostatically charged and an "off mode" wherein the portion is not electrostatically charged to prevent particle accumulation on the charged portion.

The "dirty air" entering the aft exhaust passage 102 is directed into the combustion chamber 88 via a relatively large diameter aperture; e.g., a dilution aperture 94. As stated above, in some embodiments a particle separator 58 aft exhaust passage 102 may be directly engaged with an aperture (e.g., a dilution aperture 94—see FIG. 4) within a combustor wall assembly 78, 80, or alternatively a particle separator aft exhaust passage 102 may be indirectly engaged with a combustor wall assembly aperture; i.e., oriented to direct the dirty air through the aforesaid aperture. The dirty air that has entered the combustion chamber 88 subsequently becomes part of the core gas flow that provides motive force to the turbine section 34. The core gas flow path through in and aft of the turbine section 34 is typically designed to accommodate core gas flow (including its combustion products) and is therefore configured to accommodate the dirty air separated by the particle separators 58.

The portion of the air that enters the cavity member 100 (hereinafter referred to as "clean air") is understood to contain substantially less particulate matter than the dirty air. The clean air exiting the cavity member 100 may be used for a variety of different purposes. For example, as detailed above it is known to use cooling air to cool a combustor wall assembly 78, 80. Referring to FIG. 4, the cooling air may pass through cooling apertures 90, 92 disposed within the support shell 78A, 80A and/or the combustor liner panels 78B, 80B. In many instances, combustor wall assembly cooling apertures 90, 92 are relatively small in diameter and susceptible to particulate fouling. The clean air produced by the present disclosure particle separators 58 decreases the potential for fouling and therefore increase the likelihood of successful combustor wall assembly cooling over a greater period of time.

Clean air exiting the particle separators 58 within the diffuser OD flow path 62 may be used to cool the HPT components including, but not limited to, the first HPT stator vane stage 66, the first HPT rotor BOAS 70, the second HPT stator vane stage 72, the second HPT rotor BOAS 76, and the like (see FIGS. 2, 7, and 8). Clean air exiting the particle separators 58 within the diffuser ID flow path 64 may be used to cool the HPT components including, but not limited to, the first HPT stator vane stage 66, the first HPT rotor stage 68, and the second HPT stator vane stage 72. The clean air produced by the present disclosure particle separators 58 decreases the potential for fouling and therefore increase the likelihood of successful HPT component cooling over a greater period of time.

Embodiments of the present disclosure particle separators 58 that are configured to separate entrained particles both centrifugally and electrostatically are understood to provide a substantial improvement in particle separation. As stated above, the work performed on the air passing through the compressor is understood to increase the percentage of the entrained particles having a relatively smaller diameter and decrease the percentage of entrained particles having a relatively larger diameter. The present disclosure particle separator 58 embodiments that employ a combination of centrifugal and electrostatic separation is understood to be effective at removing both larger entrained particles (more susceptible to centrifugal forces) and smaller particles (less susceptible to centrifugal forces, but more apt to have a particular electrostatic charge). It is understood that not all entrained particles will have the same electrostatic charge. It is understood further that "small" particles (i.e., those having a diameter/hydraulic diameter less than fifty microns—50 µm) typically possess a negative charge and "large" particles (i.e., those having a diameter/hydraulic diameter greater than fifty microns—50 µm) typically possess a positive charge. Present disclosure particle separator 58 embodiments that include electrostatic separation may be configured to have a portion of the particle separator 58 (e.g., the housing exterior wall 104) electrostatically charged (e.g., a positive electrostatic charge) to attract smaller entrained particles. In this manner, embodiments of the present disclosure are understood to effectively remove entrained particles having a range of diameters in the environment downstream of the compressor section 30, thereby producing "clean air" immediately upstream of hot section cooling applications that are susceptible of particulate fouling. In some applications, the present disclosure particle separators 58 may make it possible to utilize decreased diameter cooling holes (otherwise not practical due to particulate fouling potential) that may provide cooling benefits.

In those present disclosure embodiments that include one or more particle agglomerators 59, the particle agglomerators 59 may be operated continuously, intermittently, or during specific flight portions. For example, as indicated herein, air contamination primarily occurs at takeoff and landing due to the higher concentration of dirt particles near the ground. In view thereof, the present disclosure system may be controlled to operate the particle agglomerators 59 during those portions of a flight potentially subject to heavier particle ingestion (e.g., takeoff and landing) and to not operate the particle agglomerators 59 during those portions of a flight above a predetermined altitude; e.g., above 2000 feet above ground level, above 1000 meters above ground level, etc., and/or during a cruise portion of a flight where the air is substantially "cleaner". The particle agglomerators 59 may be operated in any portion of a flight, however. The particle agglomerators 59 may be described as being in an "on mode" when they are controlled to produce the acoustic signals and in an "off mode" when they do not produce acoustic signals. Within the present disclosure, the particle agglomerators 59 may be operated to increase the size of entrained particles and thereby facilitate separation of those particles; e.g., via centrifugal separation due to their increased mass and/or size. In those embodiments wherein the particle agglomerators 59 are non-adjustable, the characteristics of the acoustic signals may be based on empirical data indicating the propensity of certain diameter particles to be entrained within the air flow. Hence, the characteristics of the acoustic signals may be chosen to target certain diameter entrained particles. In those embodiments that include a plurality of particle agglomerators 59, including differently configured particle agglomerators 59, some agglomerators 59 may be configured to cause agglomeration of particles in a first range of diameters, and other agglomerators 59 may be configured to cause agglomeration of particles in a second range of diameters different than the first range. The agglomerated particles may be subsequently processed in the manner described herein; e.g., drawn into a particle separator and exhausted into the combustor combustion chamber 88, thereby removing the entrained particles from air flow (often referred to as "secondary air flow") that may be used within the combustor 35 or within turbine section 34 for cooling purposes as described herein. Hence, the particle agglomerators 59 are understood to enhance the ability of the present disclosure system to "clean" the air flow of entrained particles, even beyond the capability of the particle separators 58 alone.

It should be noted that the particle agglomerators 59 may be used with a variety of different particle separators 58 and therefore the present disclosure particle agglomerators 59 are not limited to use with the particle separators 58 described herein. The particle separators 58 described herein are a non-limiting example of a particle separators 58 that may be used with the particle agglomerators 59.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A turbine engine having an axial centerline, the turbine engine comprising:
   a compressor section;
   a combustor section having an annular combustor;
   an outer casing disposed radially outside of and spaced apart from the annular combustor,
   wherein a diffuser outer diameter (OD) flow path is disposed radially between the outer casing and the annular combustor;
   an inner diffuser case disposed radially inside of and spaced apart from the annular combustor,
   wherein a diffuser inner diameter (ID) f low path is disposed radially between the annular combustor and the inner diffuser case;
   a turbine section;
   a particle separator; and
   a particle agglomerator configured to produce acoustic signals that cause agglomeration of particles entrained in an air flow within the turbine engine,
   wherein the particle agglomerator includes a first said particle agglomerator disposed in the diffuser OD flow path, and a second said particle agglomerator disposed in the diffuser ID flow path.

2. The turbine engine of claim 1, wherein the particle agglomerator is disposed to act on the air flow upstream of the particle separator within the turbine engine.

3. The turbine engine of claim 1, wherein the particle agglomerator includes a plurality of the first said particle agglomerators disposed in the diffuser OD flow path, and a plurality of the second said particle agglomerators disposed in the diffuser ID flow path.

4. The turbine engine of claim 3, wherein the plurality of the first said particle agglomerators are axially spaced apart from one another within the diffuser OD flow path, and the plurality of the second said particle agglomerators are axially spaced apart from one another within the diffuser ID flow path.

5. The turbine engine of claim 1, wherein the first said particle agglomerator is configured to produce first said acoustic signals and the second said particle agglomerator is configured to produce second said acoustic signals, and the first said acoustic signals are different than the second said acoustic signals.

6. The turbine engine of claim 1, wherein the particle separator is disposed within the diffuser OD flow path or the diffuser ID flow path.

7. The turbine engine of claim 1, wherein the particle agglomerator is controllable between an on mode wherein the particle agglomerator produces said acoustic signals, and an off mode wherein the particle agglomerator does not produce said acoustic signals.

8. The turbine engine of claim 1, wherein the particle agglomerator is controllable to produce said acoustic signals at a first frequency and to produce said acoustic signals at a second frequency, the second frequency different than the first frequency.

9. The turbine engine of claim 1, further comprising a fluid injector configured to inject fluid into the air flow upstream of the particle agglomerator.

10. A method of removing particles entrained within an air flow passing through a turbine engine,
    the turbine engine including a combustor section having an annular combustor, an outer casing disposed radially outside of and spaced apart from the annular combustor, an inner diffuser case disposed radially inside of and spaced apart from the annular combustor, a diffuser outer diameter (OD) flow path disposed radially between the outer casing and the annular combustor, and a diffuser inner diameter (ID) flow path disposed radially between the annular combustor and the inner diffuser case,
    the method comprising:
    using a particle agglomerator to subject the particles entrained within the air flow passing through the turbine engine to acoustic signals, the acoustic signals configured to cause at least some of the entrained particles to agglomerate with one another; and
    using at least one particle separator to remove the agglomerated particles from the air flow,
    wherein the particle agglomerator includes a first said particle agglomerator disposed in the diffuser OD flow path, and a second said particle agglomerator disposed in the diffuser ID flow path.

11. The method of claim 10, wherein the particle agglomerator is disposed to act on the air flow upstream of the at least one particle separator within the turbine engine.

12. The method of claim 10, wherein the step of using the particle agglomerator to subject the particles entrained within the air flow passing through the turbine engine to the acoustic signals includes using a plurality of the first said particle agglomerators disposed in the diffuser OD flow path, and a plurality of the second said particle agglomerators disposed in the diffuser ID flowpath.

13. The method of claim 12, wherein the plurality of the first said particle agglomerators are axially spaced apart from one another within the diffuser OD flow path, and the plurality of the second said particle agglomerators are axially spaced apart from one another within the diffuser ID flow path.

14. The method of claim 10, wherein the step of using the particle agglomerator to subject the particles entrained within the air flow passing through the turbine engine to the acoustic signals, includes using the first said particle agglomerator to produce first said acoustic signals and using the second said particle agglomerator to produce second said acoustic signals, and the first said acoustic signals are different than the second said acoustic signals.

15. The method of claim 14, wherein the first said acoustic signals are in a first frequency range, and the second said acoustic signals are in a second frequency range, wherein the first frequency range is different than the second frequency range.

16. The method of claim 10, wherein the particle agglomerator is controllable between an on mode wherein the particle agglomerator produces said acoustic signals, and an off mode wherein the particle agglomerator does not produce said acoustic signals.

17. The method of claim 10, further comprising controlling the particle agglomerator to be in an on mode during takeoff and landing of an aircraft powered by the turbine engine, and controlling the particle agglomerator to be in an off mode when the aircraft is operating above a threshold altitude.

18. The method of claim 10, further comprising injecting a fluid into the air flow upstream of the particle agglomerator.

\* \* \* \* \*